United States Patent
Ahuja et al.

(10) Patent No.: US 10,606,478 B2
(45) Date of Patent: Mar. 31, 2020

(54) HIGH PERFORMANCE HADOOP WITH NEW GENERATION INSTANCES

(71) Applicants: Mayank Ahuja, Cupertino, CA (US); Joydeep Sen Sarma, Bangalore (IN); Shrikanth Shankar, Mountain View, CA (US)

(72) Inventors: Mayank Ahuja, Cupertino, CA (US); Joydeep Sen Sarma, Bangalore (IN); Shrikanth Shankar, Mountain View, CA (US)

(73) Assignee: Qubole, Inc., Santa Clara, CA (US)

( * ) Notice: Subject to any disclaimer, the term of this patent is extended or adjusted under 35 U.S.C. 154(b) by 0 days.

(21) Appl. No.: 14/920,640

(22) Filed: Oct. 22, 2015

(65) Prior Publication Data
US 2016/0117107 A1 Apr. 28, 2016

Related U.S. Application Data

(60) Provisional application No. 62/067,019, filed on Oct. 22, 2014.

(51) Int. Cl.
*G06F 3/06* (2006.01)

(52) U.S. Cl.
CPC ............ *G06F 3/0604* (2013.01); *G06F 3/061* (2013.01); *G06F 3/067* (2013.01); *G06F 3/0644* (2013.01); *G06F 3/0649* (2013.01); *G06F 3/0685* (2013.01)

(58) Field of Classification Search
CPC ...... G06F 3/0685; G06F 3/067; G06F 3/0644; G06F 3/0604
See application file for complete search history.

(56) References Cited

U.S. PATENT DOCUMENTS

| | | | | |
|---|---|---|---|---|
| 5,603,001 | A * | 2/1997 | Sukegawa | G06F 3/0601 711/103 |
| 2002/0157113 | A1* | 10/2002 | Allegrezza | G06F 3/0611 725/115 |
| 2009/0222418 | A1* | 9/2009 | Layman | G06Q 30/0603 |
| 2010/0153482 | A1* | 6/2010 | Kim | G06F 8/61 709/201 |
| 2011/0314485 | A1* | 12/2011 | Abed | G06F 17/30796 725/14 |
| 2012/0047339 | A1 | 2/2012 | Decasper et al. | |
| 2012/0102291 | A1 | 4/2012 | Cherian et al. | |
| 2013/0124483 | A1 | 5/2013 | Furuhashi et al. | |
| 2013/0179881 | A1* | 7/2013 | Calder | G06F 9/5072 718/1 |
| 2013/0204948 | A1* | 8/2013 | Zeyliger | G06F 9/44505 709/206 |
| 2013/0227558 | A1 | 8/2013 | Du et al. | |

(Continued)

OTHER PUBLICATIONS

International Search Report completed Dec. 13, 2015; 2 pages.

*Primary Examiner* — Larry T MacKall
(74) *Attorney, Agent, or Firm* — Landmark Intellectual Property Law, PLLC

(57) ABSTRACT

The present invention is generally directed to a distributed computing system comprising a plurality of computational clusters, each computational cluster comprising a plurality of compute optimized instances, each instance comprising local instance data storage and in communication with reserved disk storage, wherein processing hierarchy provides priority to local instance data storage before providing priority to reserved disk storage.

17 Claims, 2 Drawing Sheets

(56) References Cited

U.S. PATENT DOCUMENTS

2014/0040575 A1\* 2/2014 Horn .................... G06F 3/0688
                                              711/162
2014/0059306 A1   2/2014 Bender et al.
2014/0059552 A1\* 2/2014 Cunningham .......... G09G 5/00
                                              718/102
2014/0195558 A1\* 7/2014 Murthy ............ G06F 17/30545
                                              707/770

\* cited by examiner

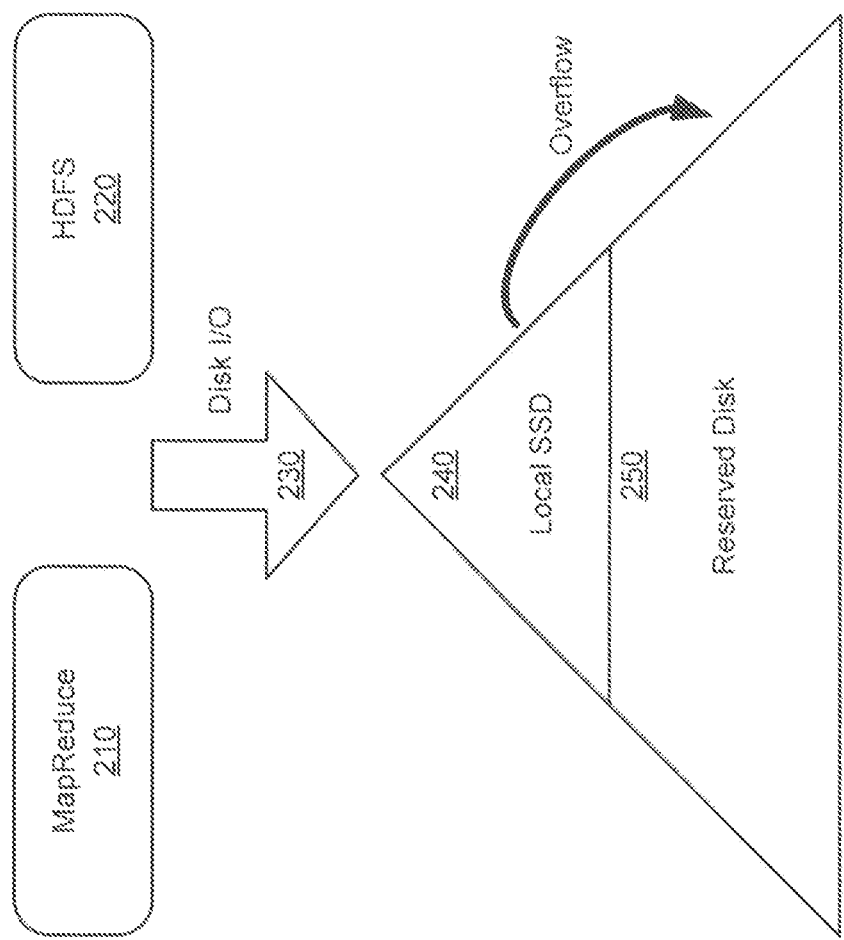

HIGH PERFORMANCE HADOOP WITH NEW GENERATION INSTANCES

RELATED APPLICATIONS

The present application claims priority to U.S. Provisional Patent Application No. 62/067,019 filed on Oct. 22, 2014 entitled "High Performance Hadoop with New Generation Instances," which is incorporated herein by reference in its entirety.

BACKGROUND

In a large scale cloud computing environment, the use of various processing and computing resources may be available at a certain cost rate. There is often a balance between the cost of resources and optimal performance. In some situations, cloud computing products or services may be offered to provide better financial rates, but with certain drawbacks. Accordingly, a large scale cloud processor may seek to either rectify or mitigate drawbacks to obtain optimal performance at desirable rates.

One popular remote computing service provider that comprises a cloud computing platform is Amazon Web Services ("AWS"), AWS offers several services, including but not limited to Amazon Elastic Compute Cloud ("EC2"). EC2, in general, is a web service that provides cloud accessible compute capacity in an elastic environment that can automatically scale up or down, depending on the need. EC2 provides users with the choice of multiple instances, configured to fit different use cases. Instance types may comprise varying combinations of CPU, memory, storage, and networking capacity. For example, through AWS EC2, instance may include general purpose instances (T2, M3), memory optimised instances (R3), graphics optimized instances (G2), storage optimized instances (I2, HS1), and— of particular relevance to the present invention—compute optimized instances (C1, CC2, C3). Compute optimized instances generally provide high performance processes.

AWS has recently introduced the C3 instance type, which has certain attractive attributes (cost, performance, etc.), However, older instance types C1 and CC2 are useful in batch data processing environments such as Apache Hadoop. Hadoop, in general, provides a framework for storage and large scale processing of datasets on computing clusters.

New instances C3 appear to offer significant advantages in various ways over previous instances. Specifically, as set forth in Table 1 below the previous instance of C1.xlarge can be compared with the new instance C3.2xlarge.

TABLE 1

| Instance Type | vCPU | ECU* | Memory (GiB) | Istance Storage (GB) | Price |
|---|---|---|---|---|---|
| c1.xlarge | 8 | 20 | 7 | 4 × 420 | $0.520 per Hour |
| c3.2xlarge | 8 | 28 | 15 | 2 × 80 SSD | $0.420 per Hour |

It can be seen above that new generation instance c3.2xlarge offers: (i) 40% better performance, in terms of EC2 compute units (ECU is an EC2 compute unite that sets forth a relative measure of the integer processing power of an AWS EC2 instance); (ii) over twice the memory; (iii) solid state device ("SSD") storage; and (iv) 19% less expensive per unit. Moreover, c3.2xlarge supports enhanced networking capabilities in a virtual private cloud ("VPC").

Accordingly, in order to utilize the advantages present in new instances such as but not limited to C3 instances, system adaptations may be desirable to account for small, local, instance storage.

SUMMARY OF THE INVENTION

Aspects in accordance with some embodiments of the present invention may include a distributed computing system comprising a plurality of computational clusters, each computational cluster comprising a plurality of compute optimized instances, each instance comprising local instance data storage and in communication with reserved disk storage, wherein processing hierarchy provides priority to local instance data storage before providing priority to reserved disk storage.

Other aspects in accordance with some embodiments of the present invention may include an auto-scaling distributed computing system comprising: a plurality of computational clusters, each computational cluster comprising a plurality of compute optimized instances, each instance comprising local instance data storage and in communication with persistent reserved disk storage, wherein: the distributed computing system is configured to use local instance data storage unless there is insufficient space on the local instance data storage; upon adding an instance to a cluster, mounting a reserved disk storage associated with the instance is delayed until disk utilization on a cluster exceeds a predetermined threshold; and upon terminating an instance from a cluster, terminating any reserved disk storage associated with the instance.

Some other aspects in accordance with some embodiments of the present invention may include an auto-scaling distributed computing system comprising: a plurality of computational clusters in a MapReduce and/or Hadoop Distributed File System model, each computational cluster comprising a plurality of C3 compute optimized instances offered by Amazon Web Services (AWS), each instance comprising local instance data storage and in communication with persistent reserved disk storage, wherein: the distributed computing system is configured to use local instance data storage unless there is insufficient space on the local instance data storage; upon adding an instance to a cluster, mounting a reserved disk storage associated with the instance is delayed until disk utilization on a cluster exceeds a predetermined threshold; and upon terminating an instance from a cluster, terminating any reserved disk storage associated with the instance.

Some other aspects in accordance with some embodiments of the present invention may include a method of providing an auto-scaling distributed computing system comprising a plurality of computational clusters in a MapReduce and/or Hadoop Distributed File System model, each computational cluster comprising a plurality of C3 compute optimized instances offered by Amazon Web Services (AWS), each instance comprising local instance data storage and in communication with persistent reserved disk storage, the method comprising: receiving a processing request; using local instance data storage for the processing request, unless: there is insufficient space on the local instance data storage; or upon a determination that intermediate data files are to be stored at least in part on directories residing on the reserved disk storage; and auto-scaling the system by; upon adding an instance to a cluster, mounting a reserved disk storage associated with the instance is delayed, until disk utilization on a cluster exceeds a predetermined threshold; and upon terminating an instance from a cluster, terminating any reserved disk storage associated with the instance.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purposes of description and should not be regarded as limiting. The detailed description will make reference to the following figures in which;

FIG. 2 graphically depicts a relationship between data storage systems and storage devices, in accordance with some embodiments of the present invention.

Figure 1:
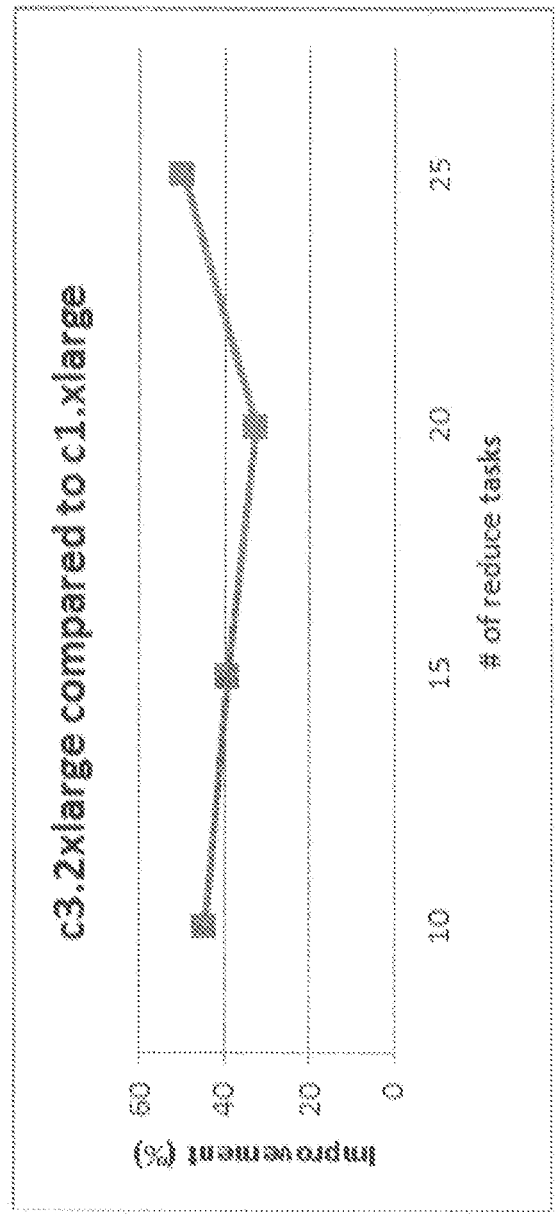
FIG. 1 sets forth a graph directed at performance of C3.2xlarge instances compared with C1xlarge instances, in accordance with some embodiments of the present Invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The mailers exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known, functions and constructions are omitted for clarity and conciseness. Moreover, as used herein, the singular may be interpreted in the plural and alternately, any term in the plural may be interpreted to be in the singular.

As noted above, C3 instances—while appealing on some levels, have certain drawbacks. Sample data was processed on Hadoop Terasort, and the runtime for sorting 100 GB of date with block sizes set to 512 M was observed. Utilizing c3.2xlarge, a 30-50% improvement was noted over previous generation c1.xlarge.

However, as illustrated in FIG. 1 which sets forth a comparison of C3.2xlarge with C1.xlarge, while performance may be improved as much as 50% (with only a 20% increase in cost), the new generation c3.2xlarge also has a significant drawback—low local instance data storage. Specifically, Table 2 below compares previous generation c1.xlarge to new C3 instances:

TABLE 2

| Instance Type | Instance Storage (GB) |
|---|---|
| c1.xlarge | 1680 [2 × 420] |
| c3.2xlarge | 160 [2 × 80 SSD] |
| c3.4xlarge | 320 [2 × 160 SSD] |
| c3.8xlarge | 640 [2 × 320 SSD] |

The contrast between previous generation c1.xlarge—that had 1.6 TB of instance storage compared to 160 GB on c3.2xlarge may be quite limiting, in other words, the limited storage per instance may not be sufficient for effectively running Hadoop clusters with high volumes of data. One reason for this is that Hadoop extensively uses instance storage for various features, such as caching, fault tolerance, and storage. The distributed file system component of Hadoop, the Hadoop Distributed File System ("HDFS"), generally relies on local storage across participating instances to store replicas of data blocks. The MapReduce framework may use a local file system for storing intermediate map outputs, spill files, distributed caches, etc. which may result in high volumes of disk usage while working with reasonably sized datasets. The lack of storage space on new generation C3 instances may make such instances unusable for jobs or tasks that may process large amounts or chunks of data. While additional nodes for storage could be utilized, such additional nodes may reduce the cost benefits provided by the new C3 instances.

Amongst EC2 and other products, AWS also offers raw block devices called Elastic Block Storage (EBS) volumes. In general, EBS provides persistent block level storage volumes for use with EC2 instances that can be used in the same manner as any other raw block device, up to 1 TB in size. EBS generally comes in three different volume types: general purpose, provisioned IOPS, and magnetic. General purpose and provisioned IOPS volumes are both backed, by solid state drives, while Magnetic are backed by magnetic drives. The additional, storage may compensate for the low instance storage available on the new C3 instances.

However, general purpose and Provisioned IOPS volumes are nearly twice the cost of Magnetic EBS volumes. Yet, Magnetic EBS volumes provide bursty performance with a maximum in-put out-put operations per second ("IOPS")/ volume of 40-200; in comparison general purpose EBS volumes can burst up to 3,000 IOPS/volume, while Provisioned IOPS can perform at 4,000.

In general, Hadoop uses available disks in a JBOD configuration (just a bunch of disks), and if EBS volumes were to participate in all operations the performance would likely be degraded, since all configured disks are used in a round-robin fashion. Moreover, EBS services have been, at the center of AWS cloud outages, making it questionable for heavy usage. For example, on Oct. 22, 2012 AWS EBS service became unavailable, causing various customers to similarly be unavailable. Similarly, even using the least expensive Magnetic EBS storage, additional costs may quickly add up if there are a large number of requests over time.

In order to accommodate the use of new generation C3 instances—and address the disadvantages of such instances discussed above—the notion of reserved disks within a stack is introduced. Accordingly, a disk hierarchy may exist where faster disks on an instance may have priority over slower disks. Reserved disks may only be used when the storage requirements may not be satisfied by existing disks on the instance. For example, with reference to FIG. 2, SSD disks may be used for regular functioning, while mounted EBS volumes may act as reserved disks for space as needed.

As shown in FIG. 2, MapReduce 210 and/or HDFS 220 may communicate via disk I/O 230 with storage devices. The first storage device may be local SSD 240—which may generally be used for regular functioning. In the case of additional needed space, overflow work may utilize Reserved Disk 250—which, for example, may comprise mounted EBS volumes.

Within the MapReduce framework, various contexts utilize read and write to a local disk storage. For example, mapred.local.dir configuration is often used for storing intermediate data files. The configuration value may contain directories residing on the low latency and high throughput SSD volumes.

With respect to instances with low local storage, an additional configuration, property (local.reserved.dir) may be set to contain a list of directories residing on mounted EBS volumes. These EBS directories may be accessed by the instance only in the case where the request to read, write, or existence check could be served from the regular local SSD volumes. In this manner, if there is sufficient space on the fast volumes (e.g., the SSD volumes), then high latency EBS volumes would not be used. In addition, if a job is completed, the intermediate data associated with the job may be cleaned up thereby making the SSD volumes available for other jobs.

Reserved EBS disks may be used in a round-robin scheme for allocation. The last reserved disk on which a file operation was performed may be noted and tracked. Subsequent write requests then, be processed using the next disk having sufficient capacity. Such round-robin scheme may ensure that tasks on the same instance may be distributed across volumes, and that a single volume does not become a bottleneck. Such an allocation scheme is similar to local directory allocation in Hadoop (LocalDirAllocator).

With respect to Hadoop Distributed File System (HDFS), it can be configured to use reserved volumes using configuration parameters dfs.reserved.dir. Volumes specified in the parameter may be marked as reserved. Target nodes selected for placing a block replica may use the reserved disk/EBS volume only if there is insufficient space on the disks specified in dfs.data.dir. As before, the reserved volumes in HDFS may follow a round-robin scheme, and a reserved volume may only be used if it is healthy.

In an auto-scaling environment, workloads may have uneven spikes, and clusters may witness up-scaling and down-scaling activity. Once an instance is added to a cluster, the reserved volumes may be automatically mounted to the instance, and may be ready to use. In order to reduce costs, such automatically mounting of reserved volumes may be delayed until the disk utilization on a node crosses a certain predetermined threshold. In contrast, when a cluster downscales, the instances within the cluster may be terminated, and any EBS volumes mounted on the instances may be automatically removed and terminated. Therefore, during low load, the cluster may run with a minimum number of instances and a lower number of EBS volumes.

In accordance with some embodiments of the present invention, additional actions may be taken to reduce the cost of reserved volumes in the HDFS. For example, block replicas residing on reserved volumes may be moved to local SSD disks. Data may be balanced on the cluster with higher priority data assigned to local storage rather than reserved disks. Such balancing may be accomplished under low load or when required. With less data stored on the reserved EBS volume disks, subsequent read accesses may be avoided, thereby resulting in lower costs associated with input/output operations against EBS volumes.

Similarly, some embodiments of the present invention may further include an allocation of the volume of EBS reserved disks may be delayed until the local disk utilization of an instance falls below a certain predetermined threshold. For example, until the local disk is 80% utilized, or 5 GB has been used, EBS volume may not be allocated to an instance. Because EBS volumes can be quickly allocated, costs associated with EBS volumes may be avoided until there is a likelihood of use.

On certain, platforms (such as the Qubole platform—the assignee of the present invention), using new generation instances may provide users with an option to use reserved volumes if data requirements exceed the local storage available in the cluster. Users of the platform may even select the specific EBS storage option (general purpose, Provisioned IOPS, or Magnetic) based upon the user's desired performance.

By utilizing the mechanisms discussed above, new generation instances that are both cost effective and high performance may be utilized in concert with EBS storage, in a cost effective manner. For example, for a node in a cluster with 100 GB EBS reserved volume, static cost of the reserved volume may be around $0.17/day. This amounts to less than 2% of the daily cost of the c3.2xlarge instance, and may be lower for high-end instances in the family such as c3.4xlarge (0.8%) and c3.8xlarge (0.4%). The additional cost for the I/O operations performed on such volumes may be proportional to the amount of data stored in the cluster, in addition to the local instance storage. Additional request are priced at $0.05 per million I/O requests, thereby providing low increased cost for the utilization, of additional reserved volume.

For example, in accordance with some embodiments of the present invention a platform (such as but not limited to the Qubole platform) may utilize volume types that support better throughput and input/output operations per second (IOPS), such as but not limited to AWS general, purpose EBS volumes as compared to AWS magnetic EBS volumes), and such volumes may be treated as both reserved disks and regular disks. This dual treatment may be useful in scenarios where there may be no additional cost related to IOPS and may provide a user with a relatively inexpensive way to add storage to existing compute nodes.

It will be understood that the specific embodiments of the present invention shown and described herein are exemplary only. Numerous variations, changes, substitutions and equivalents will now occur to those skilled in the art without departing from the spirit and scope of the invention. Similarly, the specific shapes shown in the appended figures and discussed above may be varied without deviating from the functionality claimed in the present invention. Accordingly, it is intended that all subject matter described herein and shown in the accompanying drawings be regarded as illustrative only, and not in a limiting sense, and that the scope of the invention will be solely determined by the appended claims.

What is claimed is:

1. A distributed computing system comprising a plurality of computational clusters, each computational cluster utilized in a MapReduce model and comprising a plurality of compute optimized instances, each instance comprising local instance data storage and in communication with reserved disk storage, wherein processing hierarchy is configured to use local instance data storage unless there is insufficient space on the local instance data storage, thereby providing priority to local instance data storage before providing priority to reserved disk storage, wherein intermediate data files within the MapReduce model are stored at least in part on the compute optimized instances comprising a list of directories residing on the local instance data storage and a list of directories residing on the reserved disk storage, wherein the directories on the reserved disk storage are accessed when a processing request cannot be handled by the local instance data storage; and wherein the distributed computer system is configured to auto-scale:
upon adding an instance to a cluster, mounting a reserved disk storage associated with the instance is delayed until disk utilization on a cluster exceeds a predetermined threshold; and
upon terminating an instance from a cluster, terminating any reserved disk storage associated with the instance.

2. The system of claim 1, wherein the reserved disk storage provides persistent storage.

3. The system of claim 2, wherein the reserved disk storage comprises magnetic volume storage backed by magnetic drives.

4. The system of claim 1, wherein the reserved disk storage comprises solid state drives.

5. The system of claim 4, wherein the reserved disk storage comprises general purpose or provisioned input/output operations per second (TOPS) volumes using a web service that provides cloud-based resizable compute capacity.

6. The system of claim 1, wherein the computational cluster is utilized in a scalable distributed file system.

7. The system of claim 6, wherein the scalable distributed file system is configured to use reserved disk storage only if there is insufficient space on the local instance data storage.

8. The system of claim 1, wherein the processing request could not be handled due to the processing request taking longer than a predetermined amount of time.

9. The system of claim 1, wherein the processing request could not be handled due to insufficient space on the local instance data storage.

10. The system of claim 1, wherein the reserved disks are used in a round-robin scheme for allocation.

11. The system of claim 1, wherein the compute optimized instance is a C3 instance type provided by a cloud services platform.

12. An auto-scaling distributed computing system comprising:
a plurality of computational clusters, each computational cluster comprising a plurality of compute optimized instances, each instance comprising local instance data storage and in communication with persistent reserved disk storage, wherein:
the distributed computing system is configured to use local instance data storage unless there is insufficient space on the local instance data storage;
upon adding an instance to a cluster, mounting a reserved disk storage associated with the instance is delayed until disk utilization on a cluster exceeds a predetermined threshold; and
upon terminating an instance from a cluster, terminating any reserved disk storage associated with the instance.

13. The system of claim 12, wherein the computational cluster is utilized in a scalable distributed file system.

14. The system of claim 12, wherein the computational cluster is utilized in a MapReduce model.

15. The system of claim 14, wherein intermediate data files within the MapReduce model are stored at least in part on the compute optimized instances comprising a list of directories residing on the local instance data storage and a list of directories residing on the reserved disk storage, wherein the directories on the reserved disk storage are accessed when a processing request cannot be handled by the local instance data storage.

16. An auto-scaling distributed computing system comprising:
a plurality of computational clusters in a MapReduce and/or a scalable distributed file system model, each computational cluster comprising a plurality of C3 compute optimized instances offered by a cloud services platform, each instance comprising local instance data storage and in communication with persistent reserved disk storage, wherein:
the distributed computing system is configured to use local instance data storage unless there is insufficient space on the local instance data storage;
upon adding an instance to a cluster, mounting a reserved disk storage associated with the instance is delayed until disk utilization on a cluster exceeds a predetermined threshold; and
upon terminating an instance from a cluster, terminating any reserved disk storage associated with the instance.

17. A method of providing an auto-scaling distributed computing system comprising a plurality of computational clusters in a MapReduce and/or a scalable distributed file system model, each computational cluster comprising a plurality of C3 compute optimized instances offered by a cloud services platform, each instance comprising local instance data storage and in communication with persistent reserved disk storage, the method comprising:
receiving a processing request;
using local instance data storage for the processing request, unless:
there is insufficient space on the local instance data storage; or
upon a determination that intermediate data files are to be stored at least in part on directories residing on the reserved disk storage; and
auto-scaling the system by:
upon adding an instance to a cluster, mounting a reserved disk storage associated with the instance is delayed until disk utilization on a cluster exceeds a predetermined threshold; and
upon terminating an instance from a cluster, terminating any reserved disk storage associated with the instance.

* * * * *